United States Patent
Yui et al.

(10) Patent No.: US 8,833,150 B2
(45) Date of Patent: Sep. 16, 2014

(54) APPARATUS AND METHOD FOR DETECTING ABNORMALITY OF IMBALANCE OF AIR-FUEL RATIOS AMONG CYLINDERS

(71) Applicants: Takashi Yui, Miyoshi (JP); Kota Hayashi, Nagoya (JP); Tokiji Ito, Toyota (JP)

(72) Inventors: Takashi Yui, Miyoshi (JP); Kota Hayashi, Nagoya (JP); Tokiji Ito, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 74 days.

(21) Appl. No.: 13/687,910

(22) Filed: Nov. 28, 2012

(65) Prior Publication Data

US 2013/0133401 A1    May 30, 2013

(30) Foreign Application Priority Data

Nov. 29, 2011   (JP) .................................. 2011-260299

(51) Int. Cl.
  *G01M 15/10*    (2006.01)
  *G01M 15/04*    (2006.01)

(52) U.S. Cl.
  CPC .............. *G01M 15/042* (2013.01); *Y02T 10/40* (2013.01)
  USPC ...................................... 73/114.72; 73/23.32

(58) Field of Classification Search
  USPC ................. 73/23.32, 114.31, 114.32, 114.69, 73/114.71, 114.72, 114.73, 114.79
  See application file for complete search history.

(56) References Cited

U.S. PATENT DOCUMENTS 8,443,656 B2 * 5/2013 Hakariya et al. ........... 73/114.63
8,640,532 B2 * 2/2014 Yoshikawa ................. 73/114.72
8,650,943 B2 * 2/2014 Kimura et al. ............. 73/114.72
8,682,569 B2 * 3/2014 Bagnasco et al. ............. 701/109
2001/0023674 A1  9/2001 Shimizu et al.
2009/0064967 A1  3/2009 Shikawa et al.
2011/0271665 A1* 11/2011 Iwazaki et al. .................. 60/301
2012/0160022 A1 * 6/2012 Kimura et al. ............. 73/114.72
2012/0192633 A1 * 8/2012 Hakariya et al. ........... 73/114.39
2012/0277980 A1  11/2012 Iwazaki et al.
2013/0261934 A1 * 10/2013 Iwazaki et al. ................. 701/103

FOREIGN PATENT DOCUMENTS

| JP | 2001263015 A | 9/2001 |
| JP | 2006-250039 A | 9/2006 |
| JP | 2007-198196 A | 8/2007 |
| JP | 2008-215338 A | 9/2008 |
| JP | 2010-112244 A | 5/2010 |
| WO | 2011033687 A1 | 3/2011 |
| WO | 2011074132 A1 | 6/2011 |

* cited by examiner

*Primary Examiner* — Eric S McCall
(74) *Attorney, Agent, or Firm* — Gifford, Krass, Sprinkle, Anderson & Citkowski, P.C.

(57) ABSTRACT

A detecting apparatus that detects an abnormality of imbalance of air-fuel ratios among cylinders of a multi-cylinder internal combustion engine, which is equipped with a variable working angle mechanism of an intake valve, the detecting apparatus includes an abnormality detection portion that detects a parameter regarding rotational fluctuations of each of the cylinders and detects whether or not there is an abnormality of imbalance of air-fuel ratios among the cylinders. The abnormality detection portion refrains from determining that the air-fuel ratios are normal when the working angle at the time of detection of the parameter is within a predetermined large working angle range, and determines that the air-fuel ratios are normal when the working angle at the time of detection of the parameter is within a predetermined small working angle range that is on a small working angle side with respect to the large working angle range.

4 Claims, 12 Drawing Sheets

APPARATUS AND METHOD FOR DETECTING ABNORMALITY OF IMBALANCE OF AIR-FUEL RATIOS AMONG CYLINDERS

INCORPORATION BY REFERENCE

The disclosure of Japanese Patent Application No. 2011-260299 filed on Nov. 29, 2011 including the specification, drawings and abstract is incorporated herein by reference in its entirety.

BACKGROUND OF THE INVENTION

1. Field of the Invention

The invention relates to an apparatus and a method for detecting an abnormality of imbalance of air-fuel ratios among cylinders of a multi-cylinder internal combustion engine, and more particularly, to an apparatus and a method for detecting that there is a relatively great imbalance of air-fuel ratios among cylinders in a multi-cylinder internal combustion engine.

2. Description of the Related Art

In an internal combustion engine equipped with an exhaust gas purification system that utilizes a catalyst, noxious components in exhaust gas are purified by the catalyst with high efficiency. It is therefore indispensable to control the mixing ratio of air and fuel in the mixture burned in the internal combustion engine, namely, the air-fuel ratio. In order to perform this air-fuel ratio control, an air-fuel ratio sensor is provided in an exhaust passage of the internal combustion engine. Feedback control is performed such that the detected air-fuel ratio coincides with a predetermined target air-fuel ratio.

In a multi-cylinder internal combustion engine, when air-fuel ratio control is performed using the same controlled variable for all cylinders, there is caused an imbalance of actual air-fuel ratios among the cylinders in spite of the performance of air-fuel ratio control. If the degree of this imbalance is small, the imbalance can be absorbed through air-fuel ratio feedback control, and noxious components in exhaust gas can be subjected to a purification treatment in the catalyst as well. Therefore, the exhaust emission properties are not influenced.

However, if there is caused a great imbalance of air-fuel ratios among the cylinders due to, for example, a malfunction in a fuel injection system of one or some of the cylinders or the like, the exhaust emission properties may be deteriorated. Such a great imbalance of air-fuel ratios as to deteriorate the exhaust emission properties is desired to be detected as an abnormality. Especially in the case of an internal combustion engine for a vehicle, with a view to preventing the vehicle from traveling with the exhaust emission properties deteriorated, there have been demands to detect an abnormality of imbalance of air-fuel ratios among the cylinders onboard.

For example, according to the disclosure of Japanese Patent Application Publication No. 2010-112244 (JP-2010-112244 A), it is determined, on the basis of a calculated value of air-fuel ratio feedback control, whether or not there is an air-fuel ratio abnormality. If it is determined that there is an air-fuel ratio abnormality, the time of fuel injection into each of cylinders is reduced by a predetermined time, and only that one of the cylinders whose air-fuel ratio is abnormal is misfired.

For example, it is conceivable to detect a parameter regarding rotational fluctuations of each of the cylinders, and detect whether or not there is an abnormality of imbalance of air-fuel ratios among the cylinders on the basis of this detected parameter.

In recent years, internal combustion engines having cylinders in each of which the working angle (the crank angle from a valve open state to a valve closed state) of an intake valve is variable have been put into practical use.

In this type of internal combustion engine, if an attempt is made to detect an abnormality of imbalance on the basis of a parameter regarding rotational fluctuations, the following phenomenon may be caused. That is, the cause of an abnormality of imbalance of air-fuel ratios among the cylinders includes an injection amount deviation as a deviation of the amount of fuel injection from a normal value in a specific one of the cylinders, and an air amount deviation as a deviation of the amount of intake air from a normal value in a specific one of the cylinders. In the case of an injection amount deviation, especially in the case where the amount of fuel injection is deviant from the normal value toward a decreasing side, there is no influence of the working angle of an intake valve. Therefore, it is possible to determine whether the air-fuel ratios are normal or abnormal regardless of the working angle.

In the case of an air amount deviation, especially in the case where the amount of air is excessively small due to a deviation of the working angle from a normal value toward a decreasing side, the result of the determination may differ depending on the magnitude of the working angle as a non-deviant normal value. That is, in the case where the working angle as a normal value is small, there is a major influence when the working angle is deviant toward the decreasing side. Therefore, it is possible to accurately determine whether the air-fuel ratios are normal or abnormal.

However, in the case where the working angle as a normal value is large, there is a minor influence when the working angle is deviant toward the decreasing side. Thus, it may be erroneously determined that the air-fuel ratios are normal, even if the air-fuel ratios are abnormal. For this reason, it may become difficult to ensure a sufficient detection accuracy.

SUMMARY OF THE INVENTION

Thus, the invention provides an apparatus for detecting an abnormality of imbalance of air-fuel ratios among cylinders that is capable of preventing an erroneous determination and ensuring a sufficient detection accuracy.

In a first aspect of the invention, a detecting apparatus that detects an abnormality of imbalance of air-fuel ratios among cylinders of a multi-cylinder internal combustion engine, which is equipped with a variable working angle mechanism that makes variable a working angle of an intake valve of each of cylinders in the multi-cylinder internal combustion engine. The detecting apparatus that detects an abnormality includes an abnormality detection portion that detects a parameter regarding rotational fluctuations of each of the cylinders and detects, on the basis of this detected parameter, whether or not there is an abnormality of imbalance of air-fuel ratios among the cylinders. In this apparatus, the abnormality detection portion refrains from determining that the air-fuel ratios are normal when the working angle at the time of detection of the parameter is within a predetermined large working angle range, and determines that the air-fuel ratios are normal when the working angle at the time of detection of the parameter is within a predetermined small working angle range that is on a small working angle side with respect to the large working angle range.

In the aforementioned apparatus for detecting an abnormality, it is appropriate to refrain from determining that the air-fuel ratios are normal when the working angle at the time of detection of the parameter is within the large working angle range even if the detected parameter is a value that is on a normal side with respect to a predetermined criterial value.

In the aforementioned apparatus for detecting an abnormality, it is appropriate to detect an abnormality of imbalance of air-fuel ratios among the cylinders that results from a decreasing deviation of a working angle of a specific one of the cylinders.

In the aforementioned apparatus for detecting an abnormality, the large working angle range may include a maximum working angle, and the small working angle range may include a minimum working angle.

In a second aspect of the invention, a method for detecting an abnormality of imbalance of air-fuel ratios among cylinders of a multi-cylinder internal combustion engine, which is equipped with a variable working angle mechanism that makes variable a working angle of an intake valve of each of cylinders in the multi-cylinder internal combustion engine. The method for detecting the abnormality includes detecting a parameter regarding rotational fluctuations of each of the cylinders, refraining from determining that the air-fuel ratios are normal when the working angle at the time of detection of the parameter is within a predetermined large working angle range, and determining that the air-fuel ratios are normal when the working angle at the time of detection of the parameter is within a predetermined small working angle range that is on a small working angle side with respect to the large working angle range.

In the aforementioned method for detecting an abnormality, a determination that the air-fuel ratios are normal may be withheld when the working angle at the time of detection of the parameter is within the large working angle range even if the detected parameter is a value that is on a normal side with respect to a predetermined criterial value.

In the aforementioned method for detecting an abnormality, an abnormality of imbalance of air-fuel ratios among the cylinders that results from a decreasing deviation of a working angle of a specific one of the cylinders may be detected.

In the method for detecting an abnormality, the large working angle range may include a maximum working angle, and the small working angle range may include a minimum working angle.

According to the invention, an excellent effect of making it possible to ensure a sufficient detection accuracy while preventing an erroneous determination is achieved.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

The embodiment of the invention will be described hereinafter on the basis of FIGS. 1 to 13.

Figure 1:
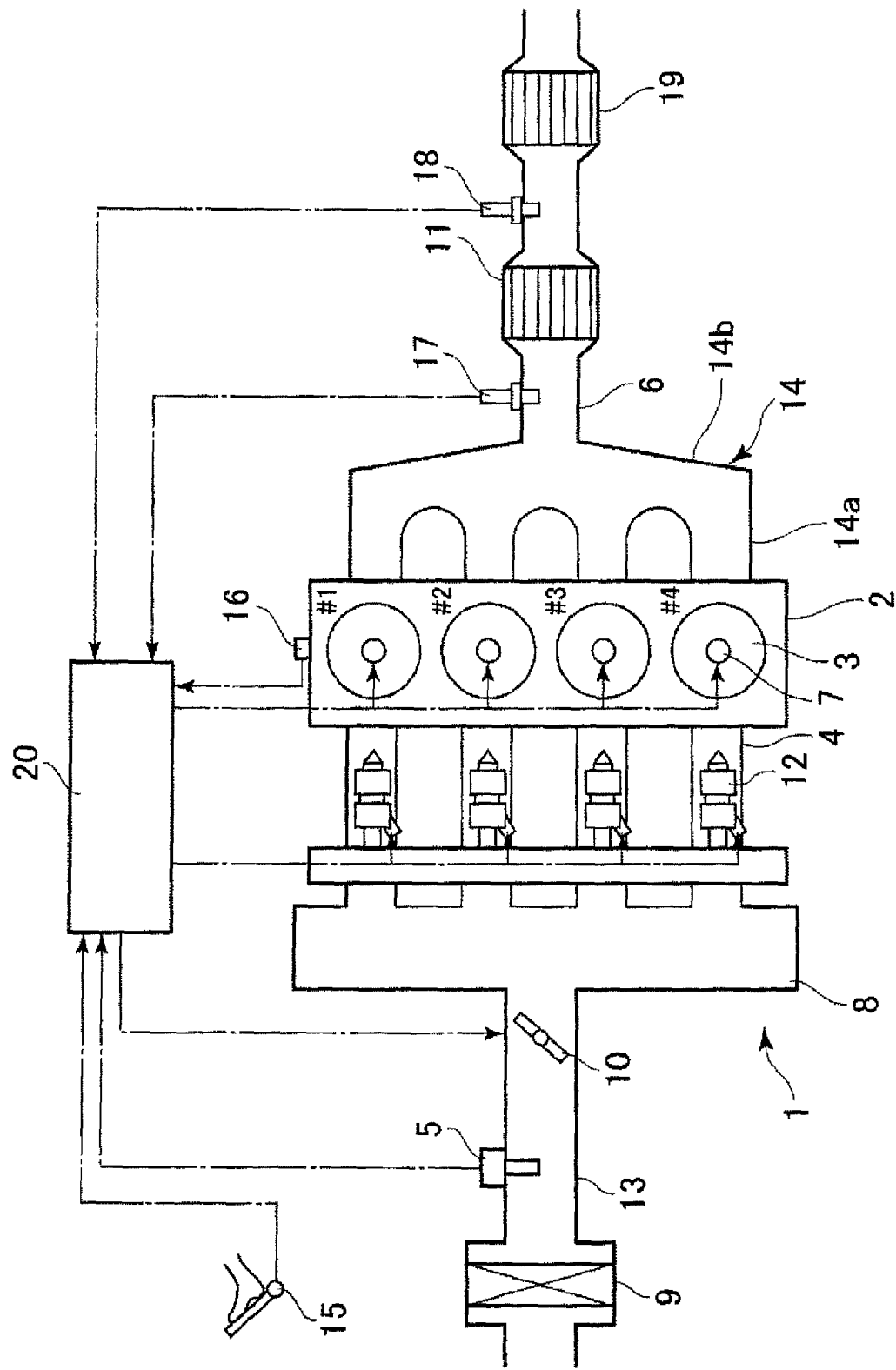
FIG. 1 is a schematic view of an internal combustion engine according to the embodiment of the invention.

FIG. 1 is a schematic view of an internal combustion engine according to this embodiment of the invention. As shown in FIG. 1, an internal combustion engine 1 generates power by causing the mixture of fuel and air to burn inside combustion chambers 3 formed in a cylinder block 2 and causing pistons to move in a reciprocating manner in the combustion chambers 3. The internal combustion engine 1 of this embodiment of the invention is a multi-cylinder internal combustion engine that is mounted on an automobile, more specifically, an inline four-cylinder spark ignition internal combustion engine. The internal combustion engine 1 is equipped with cylinders #1 to #4. It should be noted, however, that the number of cylinders, the type of the internal combustion engine, and the like are not limited in particular in carrying out the invention.

Intake valves (not shown) that open/close intake ports, and exhaust valves (not shown) that open/close exhaust ports are disposed for each of the cylinders in the cylinder head of the internal combustion engine 1. The respective intake valves and the respective exhaust valves are opened/closed by a camshaft. Ignition plugs 7 for igniting the mixture in the combustion chambers 3 are mounted to the cylinders respectively on a combustion chamber side of the cylinder head.

Each of intake ports of the respective cylinders is connected to a surge tank 8 as an intake collection chamber via a corresponding one of branch pipes 4 for the respective cylinders. An intake pipe 13 is connected upstream of the surge tank 8, and an air cleaner 9 is provided upstream of the intake pipe 13. In addition, an airflow meter 5 for detecting an intake air amount and an electronically controlled throttle valve 10 are built in the intake pipe 13 sequentially from an upstream side. An intake passage is formed by the intake ports, the branch pipes 4, the surge tank 8, and the intake pipe 13.

Each of injectors (fuel injection valves) 12 that inject fuel into the intake passage, more particularly, into the intake ports is disposed for a corresponding one of the cylinders. Fuel injected from the injectors 12 is mixed with intake air to form the mixture. This mixture is sucked into the combustion chambers 3 upon the opening of the intake valves, compressed by the pistons, and ignited by the ignition plugs 7 to be burnt. The injectors may directly inject fuel into the combustion chambers 3.

Exhaust ports of the respective cylinders are connected to an exhaust manifold 14. The exhaust manifold 14 is composed of branch pipes 14a and an exhaust collection portion 14b. The branch pipes 14a constitute an upstream portion of the exhaust manifold 14, and are provided respectively for the cylinders. The exhaust collection portion 14b constitutes a downstream portion of the exhaust manifold 14. An exhaust pipe 6 is connected downstream of the exhaust collection portion 14b. An exhaust passage is formed by the exhaust ports, the exhaust manifold 14, and the exhaust pipe 6.

Catalysts formed as three-way catalysts are mounted in series to the exhaust pipe 6 on an upstream side thereof and a downstream side thereof, respectively. These catalysts are an upstream catalyst 11 and a downstream catalyst 19, respectively. These catalysts 11 and 19 have oxygen occlusion capacity ($O_2$ storage capacity). The catalysts 11 and 19 occlude surplus oxygen in exhaust gas to reduce NOx, when the air-fuel ratio of exhaust gas is larger than the stoichiometric air-fuel ratio (a theoretical air-fuel ratio, e.g., A/F=14.6) (lean). Besides, the catalysts 11 and 19 discharge occluded oxygen to oxidize HC and CO in exhaust gas, when the air-fuel ratio of exhaust gas is smaller than the stoichiometric air-fuel ratio (rich).

Air-fuel ratio sensors for detecting an air-fuel ratio of exhaust gas, namely, a pre-catalyst sensor 17 and a post-catalyst sensor 18 are installed upstream and downstream of the upstream catalyst 11, respectively. This pre-catalyst sensor 17 and this post-catalyst sensor 18 are installed immediately in front of and immediately behind the upstream catalyst 11, respectively, and detect an air-fuel ratio on the basis of a concentration of oxygen in exhaust gas. The single pre-catalyst sensor 17 is installed in an exhaust gas merging portion upstream of the upstream catalyst 11.

The ignition plugs 7, the throttle valve 10, the injectors 12, and the like are electrically connected to an electronic control unit (hereinafter referred to as an ECU) 20 that serves as a control portion. The ECU 20 includes a CPU (not shown), a ROM (not shown), a RAM (not shown), input/output ports (not shown), a storage device (not shown), and the like. Besides, as shown in the drawing, a crank angle sensor 16 that detects a crank angle of the internal combustion engine 1, an accelerator opening degree sensor 15 that detects an accelerator opening degree, and various other sensors as well as the airflow meter 5, the pre-catalyst sensor 17, and the post-catalyst sensor 18 are electrically connected to the ECU 20 via A/D converters (not shown) and the like. The ECU 20 controls the ignition plugs 7, the throttle valve 10, the injectors 12, and the like on the basis of detection values of the various sensors and the like, such that a desired output is obtained, and thus controls the ignition timing, the fuel injection amount, the fuel injection timing, the throttle opening degree, and the like.

The throttle valve 10 is provided with a throttle opening degree sensor (not shown), and a signal from the throttle opening degree sensor is sent to the ECU 20. The ECU 20 usually controls, through feedback, the opening degree of the throttle valve 10 (the throttle opening degree) to a target throttle opening degree that is determined in accordance with an accelerator opening degree.

The ECU 20 detects an intake air flow rate as an intake air amount per unit time, on the basis of a signal from the airflow meter 5. The ECU 20 then detects a load of the engine 1 on the basis of at least one of the detected accelerator opening degree, the detected throttle opening degree, and the detected intake air amount.

The ECU 20 detects a crank angle itself and detects a rotational speed of the engine 1 on the basis of a crank pulse signal from the crank angle sensor 16. It should be noted herein that "the rotational speed" means the number of revolutions per unit time. In this embodiment of the invention, the rotational speed means the number of revolutions per minute (rpm).

Figure 2:
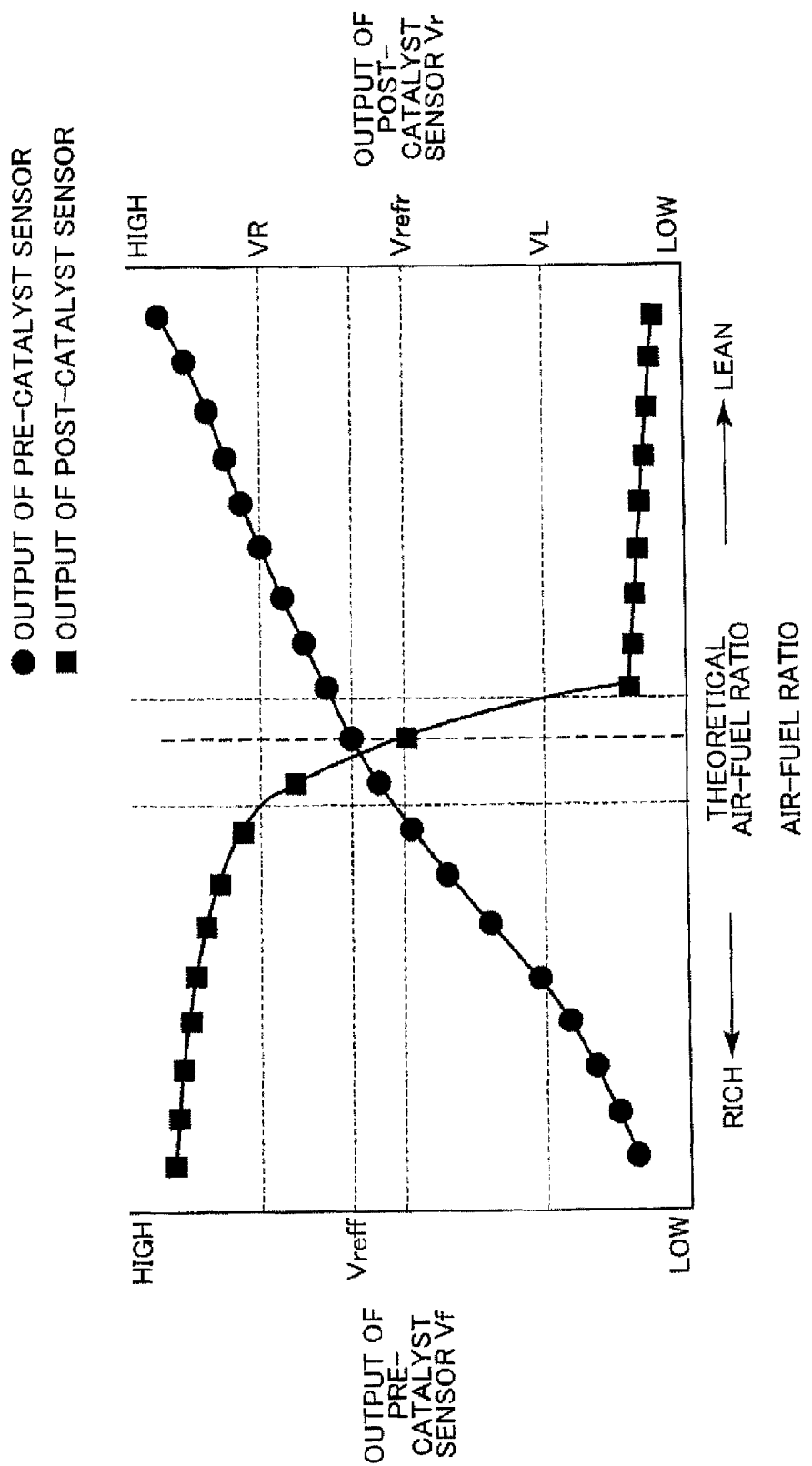
FIG. 2 is a graph showing output characteristics of a pre-catalyst sensor and a post-catalyst sensor in this embodiment of the invention.

The pre-catalyst sensor 17 is configured as a so-called wide range air-fuel ratio sensor, and can continuously detect air-fuel ratios over a relatively wide range. FIG. 2 shows an output characteristic of the pre-catalyst sensor 17. As shown in FIG. 2, the pre-catalyst sensor 17 outputs a voltage signal Vf of a magnitude that is proportional to the air-fuel ratio of exhaust gas. The output voltage at the time when the air-fuel ratio of exhaust gas is stoichiometric air-fuel ratio is Vreff (e.g., about 3.3 V).

The post-catalyst sensor 18 is configured as a so-called $O_2$ sensor, and has such a characteristic that the output value thereof suddenly changes across the stoichiometric air-fuel ratio. FIG. 2 shows an output characteristic of the post-catalyst sensor 18. As shown in FIG. 2, the output voltage at the time when the air-fuel ratio of exhaust gas is stoichiometric air-fuel ratio, namely, the stoichiometric air-fuel ratio equivalent value is Vrefr (e.g., 0.45 V). The output voltage of the post-catalyst sensor 18 changes within a predetermined range (e.g., 0 to 1 V). When the air-fuel ratio of exhaust gas is leaner than the stoichiometric air-fuel ratio, the output voltage of the post-catalyst sensor is lower than the stoichiometric air-fuel ratio equivalent value Vrefr. When the air-fuel ratio of exhaust gas is richer than the stoichiometric air-fuel ratio, the output voltage of the post-catalyst sensor is higher than the stoichiometry equivalent value Vrefr.

Each of the upstream catalyst 11 and the downstream catalyst 19 simultaneously purifies NOx, HC, and CO as noxious components in exhaust gas when the air-fuel ratio A/F of exhaust gas flowing thereinto is close to the stoichiometric air-fuel ratio. The width (the window) of the air-fuel ratio that allows these three components to be simultaneously purified with high efficiency is relatively narrow.

During normal operation, the ECU 20 performs air-fuel ratio feedback control such that the air-fuel ratio of exhaust gas flowing into the upstream catalyst 11 is controlled to a value close to the stoichiometric air-fuel ratio. This air-fuel ratio feedback control consists of main air-fuel ratio control (main air-fuel ratio feedback control) that is designed to make the air-fuel ratio of exhaust gas detected by the pre-catalyst sensor 17 coincide with the stoichiometric air-fuel ratio as a target air-fuel ratio, and sub air-fuel ratio control (sub air-fuel ratio feedback control) that is designed to make the air-fuel ratio of exhaust gas detected by the post-catalyst sensor 18 coincide with the stoichiometric air-fuel ratio.

Air-fuel ratio feedback control that is thus designed to set the stoichiometric air-fuel ratio as a target air-fuel ratio is referred to as stoichiometric control. The stoichiometric air-fuel ratio is regarded as a reference air-fuel ratio.

Figure 3:
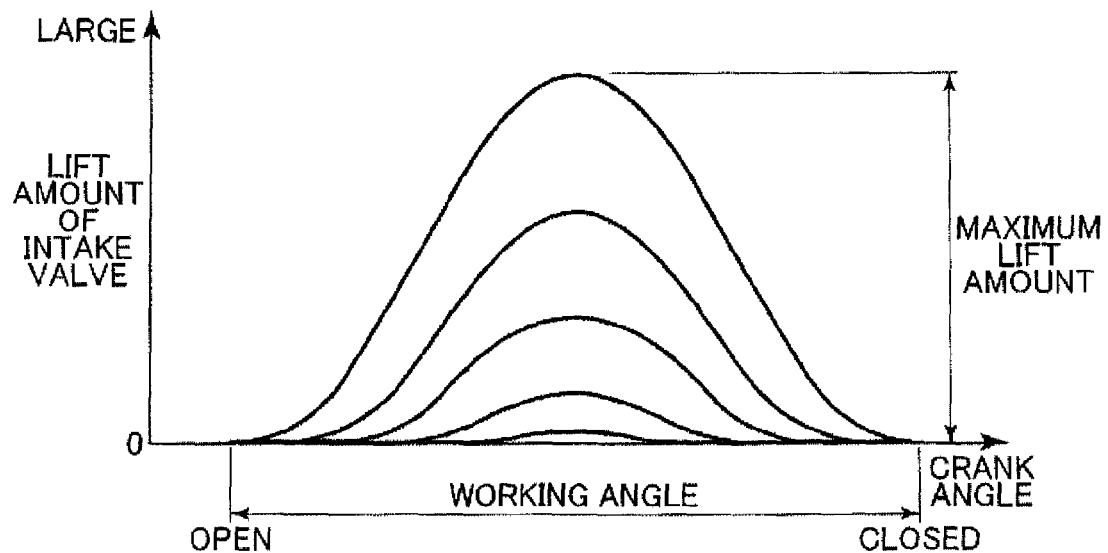
FIG. 3 is a diagrammatic view showing a variable working angle characteristic of an intake valve in this embodiment of the invention.

The engine 1 of this embodiment of the invention is provided with a variable working angle mechanism that makes variable the working angle of the intake valve of each of the cylinders. FIG. 3 shows how the working angle of the intake valve is changed by the variable working angle mechanism, and FIG. 4 shows the structure of the variable working angle mechanism.

As shown in FIG. 3, the variable working angle mechanism continuously changes the working angle of the intake valve. In this embodiment of the invention, the maximum lift amount of the intake valve is also continuously changed by the variable working angle mechanism. The working angle and the maximum lift amount are changed in synchronization with each other. The maximum lift amount decreases as the working angle decreases. The maximum lift amount increases as the working angle increases.

Figure 4:
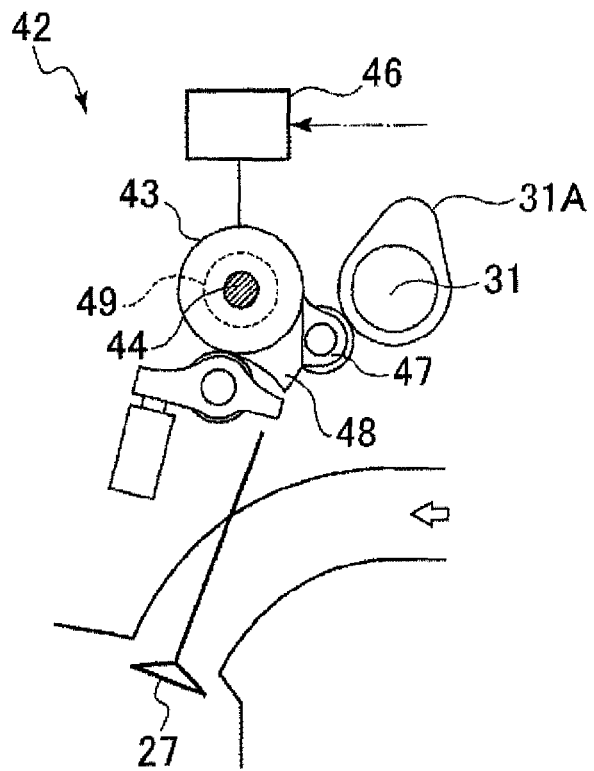
FIG. 4 is a view showing a variable working angle mechanism in this embodiment of the invention.
Figure 5:
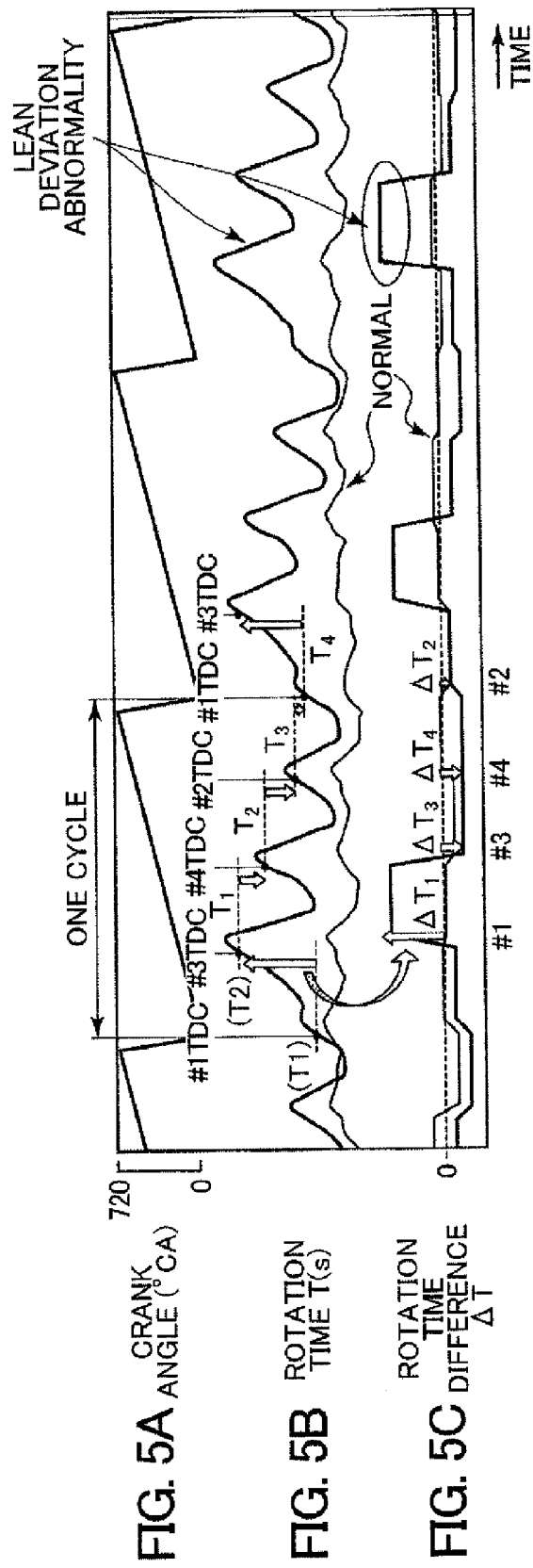
FIG. 5A is a time chart that illustrates changes in crank angle in this embodiment of the invention.
FIG. 5B is a time chart for illustrating changes in a rotation time T in this embodiment of the invention.
FIG. 5C is a time chart for illustrating changes in a rotation time difference $\Delta T$ in this embodiment of the invention.
Figure 6:
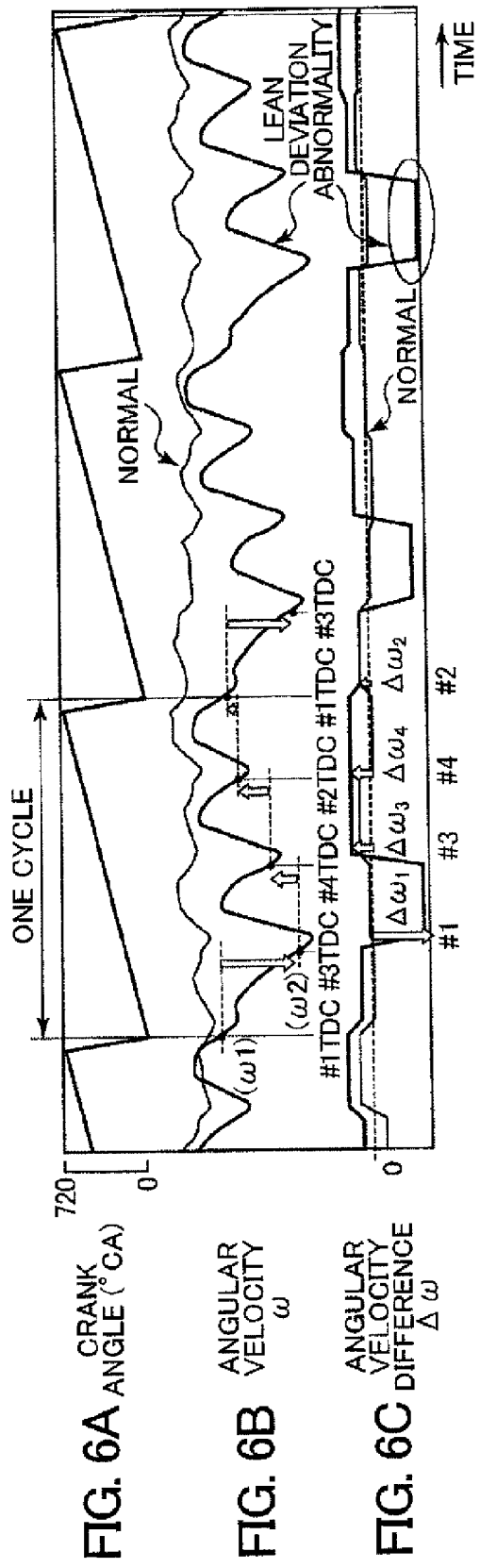
FIG. 6A is a time chart for illustrating changes in crank angle in this embodiment of the invention.
FIG. 6B is a time chart for illustrating changes in an angular velocity $\omega$ in this embodiment of the invention.
FIG. 6C is a time chart for illustrating changes in an angular velocity difference $\Delta\omega$ in this embodiment of the invention.

As shown in FIG. 4, as a variable working angle mechanism 42, it is possible to employ, for example, a mechanism that is equipped with intermediary drive mechanisms 43 provided for the cylinders respectively, and a control shaft 44 and an actuator 46 that are common to the intermediary drive mechanisms 43 for all the cylinders (see Japanese Patent Application Publication No. 2001-263015 (JP-2001-263015 A) or the like). The actuator 46 is equipped with, for example, an electric motor that is controlled by the ECU 20, and a power transmission mechanism that converts rotation of the electric motor into rectilinear motion and transmits this rectilinear motion to the control shaft 44. When the electric motor rotates through energization, the power transmission mechanism operates accordingly, so that the control shaft 44 is displaced in an axial direction thereof.

Each of the intermediary drive mechanisms 43 is provided between an intake camshaft 31 and an intake valve 27, and is equipped with an input arm 47 and an output arm 48. A slider 49 for power transmission is turnably and axially movably interposed between the control shaft 44 and the input arm 47 and/or the output arm 48. The slider 49 and the input arm 47 and/or the output arm 48 mesh with each other through helical spline.

When the intake camshaft 31 rotates, the input arm 47 is vertically rocked by an intake cam 31A with the control shaft 44 serving as a fulcrum. This rocking is transmitted to the output arm 48 via the slider 49, so that the output arm 48 is vertically rocked. The intake valve 27 is driven to be opened/closed by this rocking output arm 48.

The control shaft 44 is moved in the axial direction by the actuator 46, so that the slider 49 rotates while being displaced in this direction. Then, in the rocking direction of the input arm 47 and the output arm 48, the relative phase difference between the input arm 47 and the output arm 48 is changed. As a result of this change, the valve characteristics (the working angles and maximum lift amounts) of the intake valves 27 of all the cylinders change continuously and uniformly. When the relative phase difference is small, both the working angle and the maximum lift amount are small, and the intake air amount per cylinder is small. When the relative phase difference increases, both the working angle and the maximum lift amount increase, and the intake air amount increases.

The ECU 20 controls the variable working angle mechanism 42 (especially the electric motor of the actuator 46 thereof) in accordance with the detected rotational speed and the detected load, and controls the working angle. More specifically, the ECU 20 calculates a target working angle corresponding to the detected rotational speed and the detected load, from a predetermined map (which may also be a function as will hold true hereinafter), and controls the variable working angle mechanism 42 such that the actual working angle coincides with this calculated target working angle. The working angle is increased as the rotational speed increases or as the load increases.

The working angle of the intake valve is continuously changed in accordance with the rotational speed and the load as described above, so that the amount of air sucked into each of the combustion chambers 3 is changed over the entire operation range. Thus, the throttle opening degree can also be made larger than usual or smaller than usual. Thus, the pumping loss is reduced, and the same output is obtained with a smaller amount of air and a smaller amount of fuel. As a result, fuel economy and the like can be improved.

It should be noted herein that an imbalance of air-fuel ratios among the cylinders may occur due to a malfunction in the injector 12 of one or some of all the cylinders (especially, certain one of the cylinders). In such a case, for example, the injector 12 of the cylinder #1 malfunctions, the fuel injection amount of the cylinder #1 becomes larger than the fuel injection amounts of the other cylinders #2, #3, and #4, and the air-fuel ratio of the cylinder #1 greatly shifts to the rich side. At this time as well, if a relatively large correction amount is given through the aforementioned stoichiometric control, the air-fuel ratio of the entire gas supplied to the pre-catalyst sensor 17 can be controlled to the stoichiometric air-fuel ratio in some cases. However, if each of the cylinders is observed individually, the air-fuel ratio of the cylinder #1 is much richer than the stoichiometric air-fuel ratio, and the air-fuel ratios of the cylinders #2, #3, and #4 are slightly leaner than the stoichiometric air-fuel ratio. In other words, the air-fuel ratios of all the cylinders are stoichiometric merely as a whole, which may not be preferable from the standpoint of exhaust emission properties. Thus, in this embodiment of the invention, there is installed a device that detects an abnormality of such an imbalance of air-fuel ratios among the cylinders.

A value called an imbalance ratio is used as an index indicating a degree of imbalance of air-fuel ratios among the cylinders. The imbalance ratio is a value indicating a ratio at which the fuel injection amount of one of the cylinders in which the fuel injection amount is deviant (an imbalanced cylinder) deviates from the fuel injection amount of the cylinders in which the fuel injection amount is not deviant (balanced cylinders), namely, a reference injection amount in the case where the fuel injection amount is deviant only in that one of the cylinders among the plurality of the cylinders. Given that the imbalance ratio is denoted by IB (%), that the fuel injection amount of the imbalanced cylinder is denoted by Qib, and that the fuel injection amount of the balanced cylinders, namely, the reference injection amount is denoted by Qs, there is established a relationship expressed as follows: $IB=(Qib-Qs)/Qs \times 100$. As the imbalance ratio IB increases, the deviation of the fuel injection amount of the imbalanced cylinder from the fuel injection amount of the balanced cylinders increases, and the degree of imbalance of air-fuel ratios increases.

In this embodiment of the invention, a parameter regarding rotational fluctuations in the respective cylinders is detected, and it is detected, on the basis of this detected parameter, whether or not there is an abnormality of imbalance.

Rotational fluctuations mean changes in the rotational speed of the engine or changes in the rotational speed of the crankshaft. For example, rotational fluctuations can be expressed as a value as stated below. In this embodiment of the invention, rotational fluctuations of the respective cylinders can be detected individually.

FIGS. 5A to 5C show time charts for illustrating rotational fluctuations. In examples shown in FIGS. 5A to 5C, the air-fuel mixture is ignited in the sequence of the cylinders #1, #3, #4, and #2.

FIG. 5A shows a crank angle (° CA) of the engine. One engine cycle is 720 (° CA). In FIG. 5A, crank angles are successively detected corresponding to a plurality of cycles, and are shown in a sawtooth manner.

FIG. 5B shows a time needed for the crankshaft to rotate by a predetermined angle, namely, a rotation time T(s). Although the predetermined angle is 30 (° CA) in this case, another value (e.g., 10 (° CA)) may be adopted as the predetermined angle. The rotational speed of the engine decreases as the rotation time T increases. On the contrary, the rotational speed of the engine increases as the rotation time T decreases. This rotation time T is detected by the ECU 100 on the basis of the output of the crank angle sensor 16.

FIG. 5C shows a rotation time difference ΔT, which will be described later. The term "normal" in FIGS. 5B and 5C indicates a normal case where the air-fuel ratio is not deviant in any of the cylinders. The term "lean deviation abnormality" in FIGS. 5B and 5C indicates an abnormal case where the air-fuel ratio is deviant to the lean side at the imbalance ratio IB=−30 (%) only in the cylinder #1. A lean deviation abnormality may result from, for example, the clogging of injection holes of the injectors, the opening failure of the valves, or the like.

The rotation time T of each of the cylinders at the same timing is detected by the ECU. In this case, the rotation time T at the timing of a compression top dead center (TDC) of each of the cylinders is detected. The timing at which this rotation time T is detected is referred to as a detection timing.

For each detection timing, a difference (T2−T1) between a rotation time T2 at the detection timing and a rotation time T1 at an immediately preceding detection timing is detected by the ECU. This difference is the rotation time difference ΔT shown in FIG. 5C, and there is established a relationship: ΔT=T2−T1.

In a combustion stroke after the crank angle has exceeded the TDC, the rotational speed rises, and hence the rotation time T decreases. In a subsequent compression stroke, the rotational speed decreases, and hence the rotation time T increases.

In the case where there is a lean deviation abnormality in the cylinder #1 as shown in FIG. 5B, even if the air-fuel mixture in the cylinder #1 is ignited, a sufficient torque cannot be obtained, and the rotational speed is unlikely to rise. Due to this influence, the rotation time T at the TDC of the cylinder #3 has increased. Therefore, the rotation time difference ΔT at the TDC of the cylinder #3 assumes a large positive value as shown in FIG. 5C. This rotation time and this rotation time difference at the TDC of the cylinder #3 are defined as a rotation time and a rotation time difference of the cylinder #1 respectively, and are denoted by $T_1$ and $\Delta T_1$ respectively. The same holds true for the other cylinders.

Because the cylinder #3 is normal, the rotational speed abruptly rises when the air-fuel mixture in the cylinder #3 is ignited. Thus, at a subsequent timing of the TDC of the cylinder #4, the rotation time T has merely slightly decreased below the rotation time at the timing of the TDC of the cylinder #3. Therefore, a rotation time difference $\Delta T_3$ of the cylinder #3, which is detected at the TDC of the cylinder #4, assumes a small negative value as shown in FIG. 5C. In this manner, the rotation time difference ΔT is detected at each TDC of the cylinder in which the air-fuel mixture is to be ignited subsequently.

The same tendency as at the TDC of the cylinder #4 is observed at the TDC of the cylinder #2 and at the TDC of the cylinder #1 as well. Both a rotation time difference $\Delta T_4$ of the cylinder #4 and a rotation time difference $\Delta T_2$ of the cylinder #2, which are detected at both the timings respectively, assume a small negative value. The above characteristic is repeated for each cycle of the engine.

As described above, it is apparent that the rotation time difference ΔT of each of the cylinders is a value representing rotational fluctuations in each of the cylinders, and is a value correlated with the air-fuel ratio deviation amount of each of the cylinders. Accordingly, the rotation time difference ΔT of each of the cylinders can be used as a parameter regarding rotational fluctuations of each of the cylinders, namely, a rotational fluctuation parameter. As the air-fuel ratio deviation amount of each of the cylinders increases, the rotational fluctuations of each of the cylinders increase, and the rotation time difference ΔT of each of the cylinders increases.

On the other hand, as shown in FIG. 5C, the rotation time difference ΔT is always close to zero in a normal case.

The case of a lean deviation abnormality is shown in the examples of FIGS. 5A to 5C. The same tendency is observed also in the case where there is a rich deviation abnormality in only one of the cylinders. The reason for this is that in the event of a large rich deviation, even if the air-fuel mixture is ignited, combustion becomes insufficient due to an excessively large amount of fuel, a sufficient torque is not obtained, and the amplitude of rotational fluctuations increases.

Another parameter regarding rotational fluctuations will be described with reference to FIGS. 6A to 6C. FIG. 6A shows the crank angle (° CA) of the engine as is the case with FIG. 5A.

FIG. 6B shows an angular velocity ω (rad/s) as an inverse of the rotation time T in FIG. 5B. There is established a relationship: ω=1/T. The engine rotational speed increases as the angular velocity ω increases. The engine rotational speed decreases as the angular velocity ω decreases. The waveform of the angular velocity ω is obtained by vertically inverting the waveform of the rotation time T.

FIG. 6C shows an angular velocity difference Δω as a difference in the angular velocity ω, in the same manner as the rotation time difference ΔT in FIG. 5C. The waveform of the angular velocity difference Δω is also obtained by vertically inverting the waveform of the rotation time difference ΔT. The terms "normal" and "lean deviation abnormality" in FIGS. 6B and 6C mean the same as in FIGS. 5B and 5C.

The angular velocity ω at the same timing in each of the cylinders is detected by the ECU. In this case as well, the angular velocity ω at the timing of the compression top dead center (the TDC) of each of the cylinders is detected.

For each detection timing, a difference (ω2−ω1) between an angular velocity ω2 at the detection timing and an angular velocity ω1 at an immediately preceding detection timing is calculated by the ECU. This difference is the angular velocity difference Δω shown in FIG. 6C, and there is established a relationship: Δω=ω2−ω1.

In a combustion stroke after the crank angle has exceeded the TDC, the rotational speed rises, and hence the angular velocity ω rises. In a subsequent compression stroke, the rotational speed decreases, and hence the angular velocity ω decreases.

In the case where there is a lean deviation abnormality in the cylinder #1 as shown in FIG. 6B, even if the air-fuel mixture in the cylinder #1 is ignited, a sufficient torque is not obtained, and the rotational speed is unlikely to rise. Therefore, due to this influence, the angular velocity ω at the TDC of the cylinder #3 has decreased. Therefore, the angular velocity difference $\Delta\omega$ at the TDC of the cylinder #3 assumes a large negative value as shown in FIG. 6C. This angular velocity and this angular velocity difference at the TDC of the cylinder #3 are defined as an angular velocity and an angular velocity difference in the cylinder #1 respectively, and are denoted by $\omega_1$ and $\Delta\omega_1$ respectively. The same holds true for the other cylinders as well.

Since the cylinder #3 is normal, the rotational speed abruptly rises when the air-fuel mixture in the cylinder #3 is ignited. Thus, at a subsequent timing of the TDC of the cylinder #4, the angular velocity $\omega$ just slightly rises above the angular velocity at the timing of the TDC of the cylinder #3. Therefore, an angular velocity difference $\Delta\omega_3$ of the cylinder #3, which is detected at the TDC of the cylinder #4, assumes a small positive value as shown in FIG. 6C. In this manner, the angular velocity difference $\Delta\omega$ is detected at each TDC of the cylinder in which the air-fuel mixture is to be ignited subsequently.

The same tendency as at the TDC of the cylinder #4 is observed at the TDC of the cylinder #2 and at the TDC of the cylinder #1 as well. Both an angular velocity difference $\Delta\omega_4$ of the cylinder #4 and an angular velocity difference $\Delta\omega_2$ of the cylinder #2, which are detected at both the timings respectively, assume a small positive value. The above characteristic is repeated for each cycle of the engine.

As described above, the angular velocity difference $\Delta\omega$ of each of the cylinders is a value representing rotational fluctuations in each of the cylinders, and is a value correlated with the air-fuel ratio deviation amount of each of the cylinders. Therefore, the angular velocity difference $\Delta\omega$ of each of the cylinders can be used as a rotational fluctuation parameter of each of the cylinders. As the air-fuel ratio deviation amount of each of the cylinders increases, the rotational fluctuations of each of the cylinders increase, and the angular velocity difference $\Delta\omega$ of each of the cylinders decreases (increases in the minus direction).

On the other hand, as shown in FIG. 6C, the angular velocity difference $\Delta\omega$ is always close to zero in a normal case.

On the contrary, as described above, the same tendency is observed in the event of a rich deviation abnormality as well.

In the following description, for the sake of convenience, an absolute value $|\Delta\omega|$ of the angular velocity difference will be used as a rotational fluctuation parameter X ($X=|\Delta\omega|$). As the amplitude of rotational fluctuations in one of the cylinders increases, the rotational fluctuation parameter X in that cylinder increases.

An actually detected value of the rotational fluctuation parameter X of each of the cylinders is compared with a predetermined criterial value $\alpha$. If the value of the rotational fluctuation parameter X of a certain one of the cylinders is larger than the criterial value $\alpha$, it is determined that there is an abnormality of imbalance, namely, that the air-fuel ratios are abnormal, and that cylinder is identified as an abnormal cylinder. If the values of the rotational fluctuation parameter X of all the cylinders are equal to or smaller than the criterial value $\alpha$, it is determined that there is no abnormality of imbalance, namely, that the air-fuel ratios are normal.

As described above, an abnormality of imbalance results from an injection amount deviation as a deviation of the fuel injection amount from a normal value in a specific one of the cylinders, or an air amount deviation as a deviation of the intake air amount from a normal value in a specific one of the cylinders.

The injection amount deviation includes an injection amount increasing deviation as a deviation of the fuel injection amount from a normal value toward an increasing side, and an injection amount decreasing deviation as a deviation of the fuel injection amount from a normal value toward a decreasing side. The former results from, for example, a malfunction caused by a valve-closing failure of the injector 12 of a specific one of the cylinders, or the like. The latter results from, for example, a malfunction caused by the valve-opening failure of the injector 12 of a specific one of the cylinders or the clogging of the injection hole of the injector 12, or the like.

The air amount deviation includes an air amount decreasing deviation as a deviation of the intake air amount from a normal value toward a decreasing side, and an air amount increasing deviation as a deviation of the intake air amount from a normal value toward an increasing side. Both the air amount deviations can result from, for example, a deviation of the working angle of a specific one of the cylinders from a normal value toward an increasing side or a decreasing side due to a malfunction in the variable working angle mechanism 42. This embodiment of the invention acts particularly on an air amount deviation resulting from a deviation of this working angle toward the increasing side or the decreasing side, and detection of an abnormality of imbalance resulting from the air amount deviation.

Figure 7:
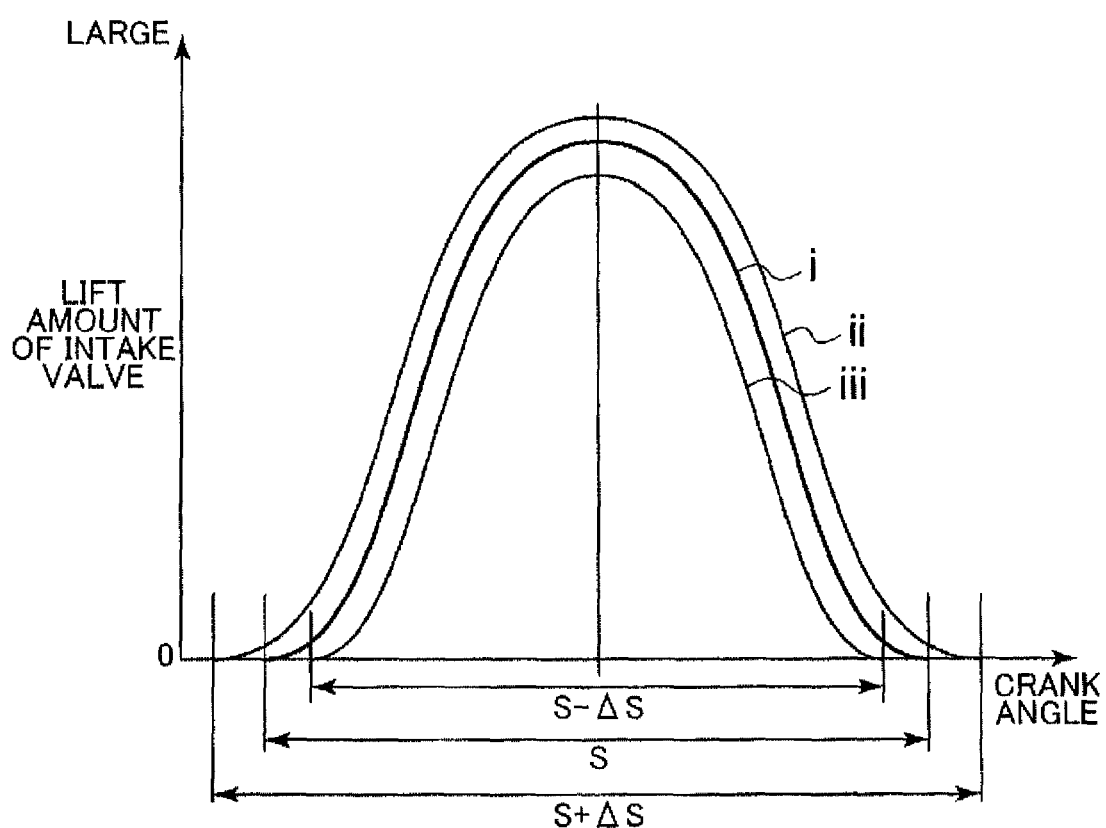
FIG. 7 is a diagrammatic view showing how the working angle deviates in an increasing direction and in a decreasing direction in this embodiment of the invention.

FIG. 7 shows how the working angle deviates toward the increasing side or the decreasing side in this embodiment of the invention. A working angle as a normal value, namely, a normal working angle is indicated by a line i, and the magnitude of the normal working angle is denoted by S. The normal working angle S is equal to, for example, 120° CA.

A working angle deviant from the normal working angle S toward the increasing side by $\Delta S$ is indicated by a line ii, and the magnitude of the working angle is $S+\Delta S$. For example, the deviation $\Delta S$ is 20° CA, and the working angle $S+\Delta S$ is 140° CA.

A working angle deviant from the normal working angle S toward the decreasing side by $\Delta S$ is indicated by a line iii, and the magnitude of the working angle is $S-\Delta S$. For example, the working angle $S-\Delta S$ is 100° CA.

In the case of this embodiment of the invention, the maximum lift amount also deviates toward the increasing side and toward the decreasing side, as the working angle deviates toward the increasing side and the decreasing side.

Figure 8:
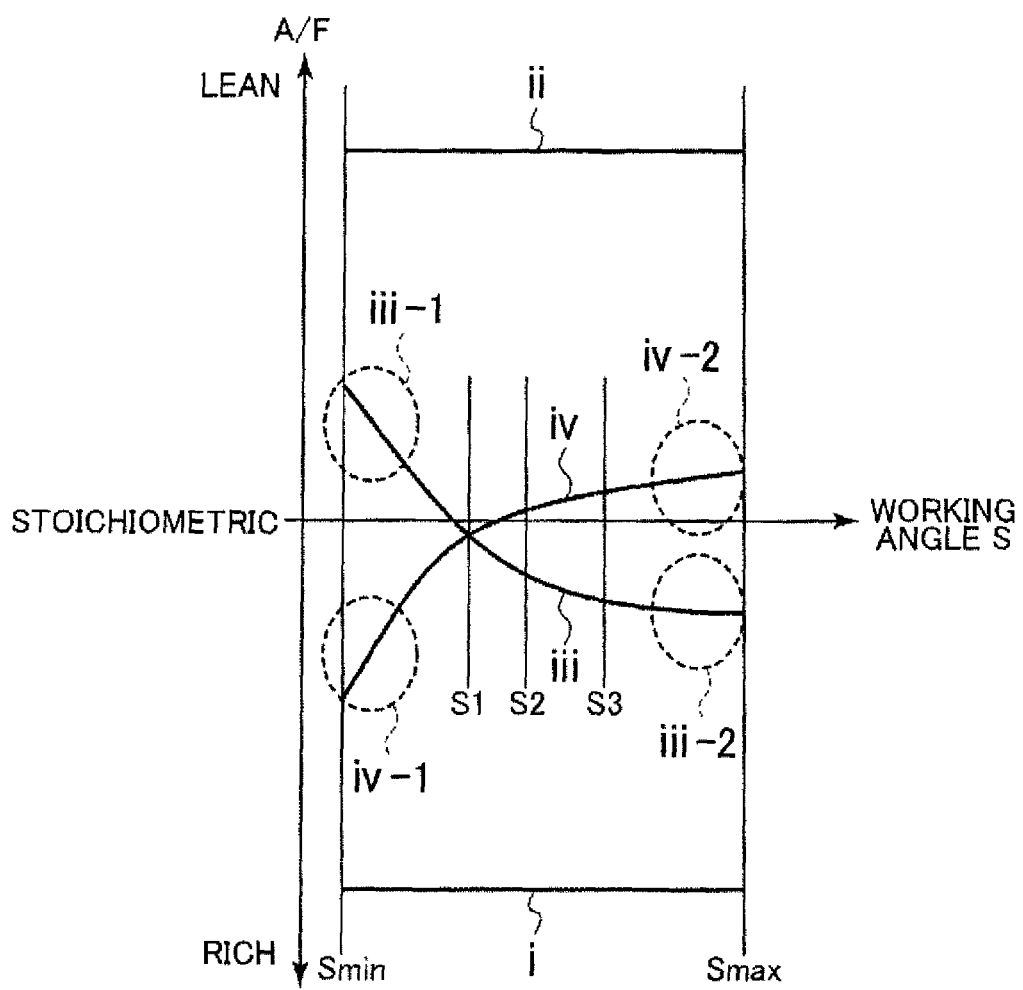
FIG. 8 is a graph showing the influence exerted on the air-fuel ratio of a specific one of cylinders by an injection amount deviation and a working angle deviation of the specific one of the cylinders in this embodiment of the invention.

FIG. 8 is a graphic representation of the influence of an injection amount deviation and a working angle deviation of a specific one of the cylinders on the air-fuel ratio A/F of the specific one of the cylinders in this embodiment of the invention. It should be noted herein that the air-fuel ratio A/F is always stoichiometric in a normal state where neither the injection amount nor the working angle is deviant. In FIG. 8, Smin denotes a minimum working angle, and Smax denotes a maximum working angle. These values are equivalent to a minimum value of the working angle and a maximum value of the working angle, respectively, in terms of working angle control.

In the case where the working angle is not deviant and only the injection amount is deviant toward the increasing side, the air-fuel ratio A/F always assumes a constant value that is richer than the stoichiometric air-fuel ratio regardless of the value of the working angle S, as indicated by the line i. Besides, in the case where the working angle is not deviant and only the injection amount is deviant toward the decreasing side, the air-fuel ratio A/F always assumes a constant value that is leaner than the stoichiometric air-fuel ratio regardless of the value of the working angle S, as indicated by the line ii. In either case, there is no influence of the working angle, and it can be determined, regardless of the working angle, whether the air-fuel ratios are normal or abnormal.

The influence of the injection amount increasing deviation as indicated by the line i on rotational fluctuations of the engine is not very great. Therefore, it is preferable to detect an injection amount increasing deviation by a method (e.g., a method utilizing output fluctuations of the pre-catalyst sensor 17) different from a detection method that utilizes rotational fluctuations in this embodiment of the invention. The influence of an injection amount decreasing deviation as indicated by the line ii on rotational fluctuations of the engine is great. Therefore, it is preferable to detect an injection amount decreasing deviation by the detection method of this embodiment of the invention.

In the case where the injection amount is not deviant and only the working angle is deviant toward the increasing side, the air-fuel ratio A/F tends to decrease (become rich) from a value leaner than the stoichiometric air-fuel ratio to a value richer than the stoichiometric air-fuel ratio as the working angle S increases (i.e., the rotational speed and/or the load increase), as indicated by a line iii.

Because of the working angle increasing deviation, a working angle and a lift amount, hence an air amount that are required for combustion are ensured, regardless of the value of the working angle S. Therefore, the influence of the working angle increasing deviation on rotational fluctuations is small. The detection method of this embodiment of the invention is not especially designed to detect an abnormality of imbalance resulting from a working angle increasing deviation.

For example, at the time of a small working angle including the minimum working angle Smin as shown within a circle iii-1, a required working angle and a required lift amount, hence a required air amount are ensured, and the rotational fluctuations do not seriously deteriorate.

At the time of a large working angle including the maximum working angle Smax as shown within a circle iii-2, since the original working angle is large, the air amount and hence the rotational fluctuations are not seriously influenced even when the working angle slightly deviates toward the increasing side. The amount of valve overlap becomes excessive, and the rotational fluctuations somewhat deteriorate, but the exhaust emission properties do not deteriorate to the extent of influencing the operation of the internal combustion engine. Accordingly, an abnormality of imbalance resulting from a working angle increasing deviation may not be set as a target to be detected.

However, when a very large working angle increasing deviation occurs, the exhaust emission properties may deteriorate to the extent of influencing the operation of the internal combustion engine. However, the failure of hardware may result from the working angle increasing deviation prior to such deterioration in the exhaust emission properties. For example, the failure includes the sticking of a valve spring in an open state, piston stamp, and the like. In this state, the intake valve regularly fails to open, and continuous misfire occurs in one of the cylinders. Therefore, the working angle increasing deviation can be detected through another diagnosis.

In the case where the injection amount is not deviant and only the working angle is deviant toward the decreasing side, the air-fuel ratio A/F tends to increase (become lean) from a value richer than the stoichiometric air-fuel ratio to a value leaner than the stoichiometric air-fuel ratio as the working angle S increases (i.e., the rotational speed and/or the load increase), as indicated by a line iv.

Especially in this case, since the working angle is deviant toward the decreasing side, the influence of the working angle decreasing deviation on the air amount is great. The influence of the working angle decreasing deviation on rotational fluctuations is great, and the detection method of this embodiment of the invention is designed to detect an abnormality of imbalance resulting from this working angle decreasing deviation.

At the time of a small working angle including the minimum working angle Smin as shown within a circle iv-1, the working angle further decreases in addition to the fact that the original working angle is small, so that a deterioration in rotational fluctuations is caused. Therefore, the magnitude of the deviation is suitably reflected by rotational fluctuations, and hence by the value of the rotational fluctuation parameter X. The time when the working angle is small is suitable as a timing for detecting an abnormality of imbalance in this embodiment of the invention.

At the time of a large working angle including the maximum working angle Smax as shown within a circle iv-2, there arises a situation different from that at the time of a small working angle. That is, since the original working angle is large, a required air amount is almost ensured even if the working angle somewhat deviates toward the decreasing side, so that a working angle deviation is unlikely to appear in rotational fluctuations. Therefore, even if there is a working angle decreasing deviation, it appears that this working angle decreasing deviation has not occurred. As a result, it may be erroneously determined that there is no abnormality of imbalance, namely, that the air-fuel ratios are normal. If there is a working angle decreasing deviation even at the time of a large working angle, the exhaust emission properties deteriorate, and therefore, it should be determined that there is an abnormality of imbalance.

Figure 9A:
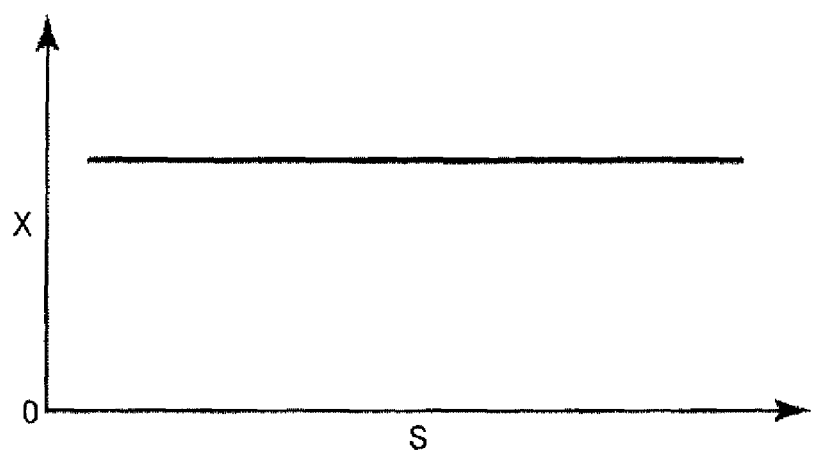
FIG. 9A is a graph showing a relationship between the working angle and a rotational fluctuation parameter in the event of an injection amount deviation in a decreasing direction in this embodiment of the invention.
Figure 9B:
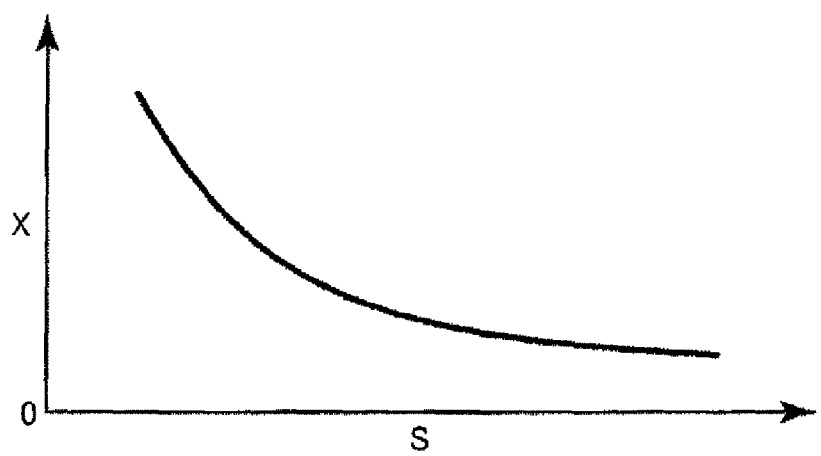
FIG. 9B is a graph showing a relationship between the working angle and the rotational fluctuation parameter in the event of a working angle deviation in a decreasing direction in this embodiment of the invention.

FIGS. 9A and 9B conceptually show a relationship between the working angle S and the rotational fluctuation parameter X in the event of an injection amount decreasing deviation and a working angle decreasing deviation, which are especially regarded as targets to be detected in this embodiment of the invention.

First of all, as shown in FIG. 9A, in the event of an injection amount decreasing deviation, the rotational fluctuation parameter X assumes a relatively large value regardless of the value of the working angle S. Therefore, the injection amount decreasing deviation can be detected from the rotational fluctuation parameter X independently of the value of the working angle S.

As shown in FIG. 9B, in the event of a working angle decreasing deviation, the rotational fluctuation parameter X changes in accordance with the value of the working angle S. The rotational fluctuation parameter X is large when the working angle S is small. However, the rotational fluctuation parameter X is small when the working angle S is large. Therefore, it is necessary to prevent an erroneous determination that the air-fuel ratios are normal when the working angle S is large.

In this embodiment of the invention, when the working angle S at the time of detection of the rotational fluctuation parameter X is within a predetermined large working angle range, a determination that the air-fuel ratios are normal is withheld (i.e., it is not determined that the air-fuel ratios are normal). Then, when the working angle S at the time of detection of the rotational fluctuation parameter X is within a predetermined small working angle range, it can be determined that the air-fuel ratios are normal.

The large working angle range and the small working angle range are, for example, as follows. That is, as shown in FIG. 8, a predetermined threshold S1 that halves the entire working angle range from the minimum working angle Smin to the maximum working angle Smax is provided, and a range of the working angle S that is larger than the threshold S1 and a range of the working angle S that is equal to or smaller than the threshold S1 are referred to as the large working angle range and the small working angle range, respectively. The maximum working angle Smax is included in the large working angle range, and the minimum working angle Smin is included in the small working angle range. The large working angle range is a range made up of working angles that are used when the engine is operated at intermediate to high load. The small working angle range is a range made up of working angles that are used when the engine is operated at low to intermediate load.

Alternatively, as shown in FIG. 8, predetermined thresholds S2 and S3 (N.B., S2<S3) that trichotomize the entire working angle range may be provided, and a range of the working angle S that is larger than the threshold S3 and a range of the working angle S that is smaller than the threshold S2 may be referred to as the large working angle range and the small working angle range, respectively. In this case as well, the maximum working angle Smax is included in the large working angle range, and the minimum working angle Smin is included in the small working angle range. The large working angle range is a range made up of working angles that are used when the engine is operated at high load. The small working angle range is a range made up of working angles that are used when the engine is operated at low load.

In either case, the small working angle range is located on a small working angle side with respect to the large working angle range.

As described above, a determination that the air-fuel ratios are normal is withheld (it is not determined that the air-fuel ratios are normal) when the working angle S is within the large working angle range, so that it is possible to prevent an erroneous determination that the air-fuel ratios are normal (an erroneous determination that there is a normal state) in the case where a working angle decreasing deviation occurs when the working angle is large. As described above, it can be determined that the air-fuel ratios are normal when the working angle S is within the small working angle range, so that an abnormality of imbalance can be accurately detected utilizing a characteristic that a working angle decreasing deviation is suitably reflected by the rotational fluctuation parameter X in the case where the deviation occurs when the working angle is small. Therefore, a sufficient detection accuracy can be ensured while preventing an erroneous determination.

A more concrete aspect of detecting an abnormality of imbalance in this embodiment of the invention will be described. A working angle control mode will be described with reference to FIG. 10.

Figure 10:
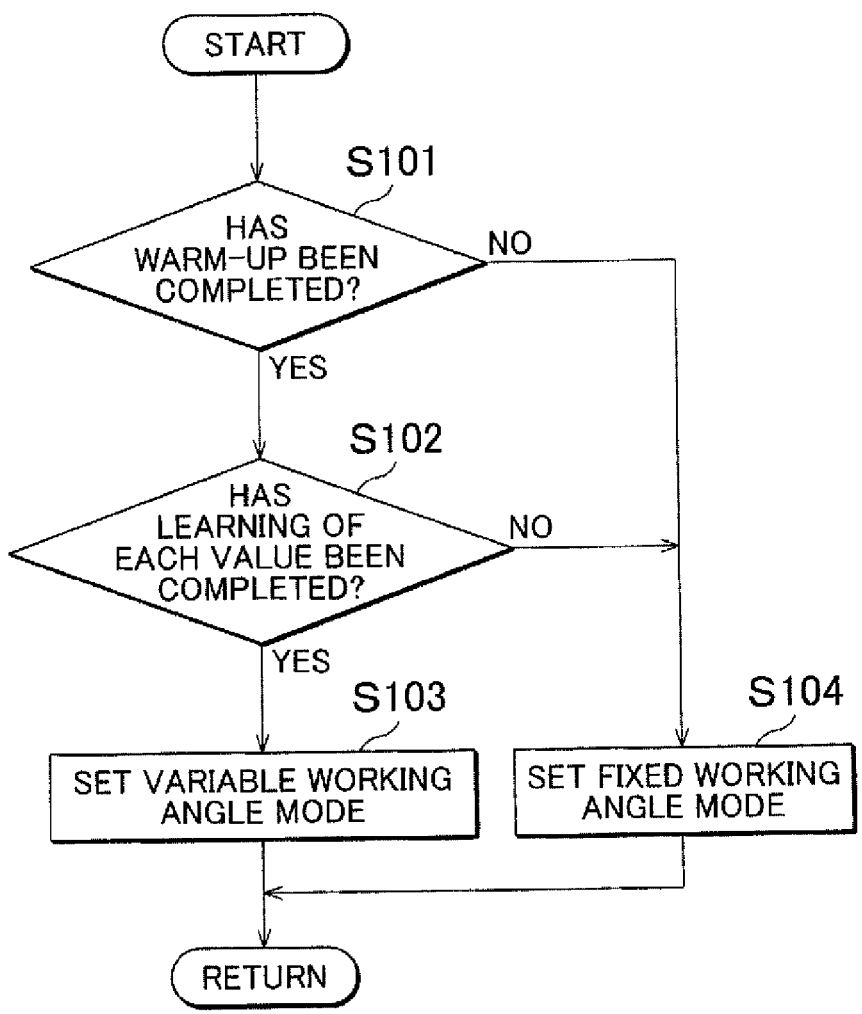
FIG. 10 is a flowchart of a routine of setting a working angle control mode in this embodiment of the invention.

FIG. 10 shows a flowchart of a routine of setting the working angle control mode in this embodiment of the invention. The routine shown in FIG. 10 is started simultaneously with engine startup by the ECU 20, and is repeatedly executed on a predetermined calculation cycle.

In step S101, it is determined whether or not the engine 1 has been warmed up. This determination is made on the basis of a temperature of engine coolant that is detected by a coolant temperature sensor (not shown). If the result of the determination is yes, a transition to step S102 is made.

In step S102, it is determined whether or not the learning of respective learning values has been completed. In engine control in this embodiment of the invention, various learning values such as a learning value in air-fuel ratio feedback control, a learning value in idle speed control, and the like are regularly learned (updated and stored) by the ECU 20. As soon as the learning of all these learning values is completed, the result of the determination in step S102 becomes yes.

If the result of the determination in step S102 is yes, a transition to step S103 is made, and the working angle control mode is set to a variable working angle mode. Thus, the working angle S of the intake valve is changed from the minimum working angle Smin to the maximum working angle Smax so as to become equal to a target working angle that is determined in accordance with a rotational speed and a load.

If the result of the determination in step S101 or step S102 is no, a transition to step S104 is made, and the working angle control mode is set to a fixed working angle mode. Thus, the working angle S of the intake valve is fixed to a certain predetermined value belonging to the large working angle range, regardless of the rotational speed and the load. In this embodiment of the invention, the working angle S of the intake valve is fixed to the maximum working angle Smax.

Next, a processing of detecting an abnormality of imbalance will be described with reference to FIG. 11.

Figure 11:
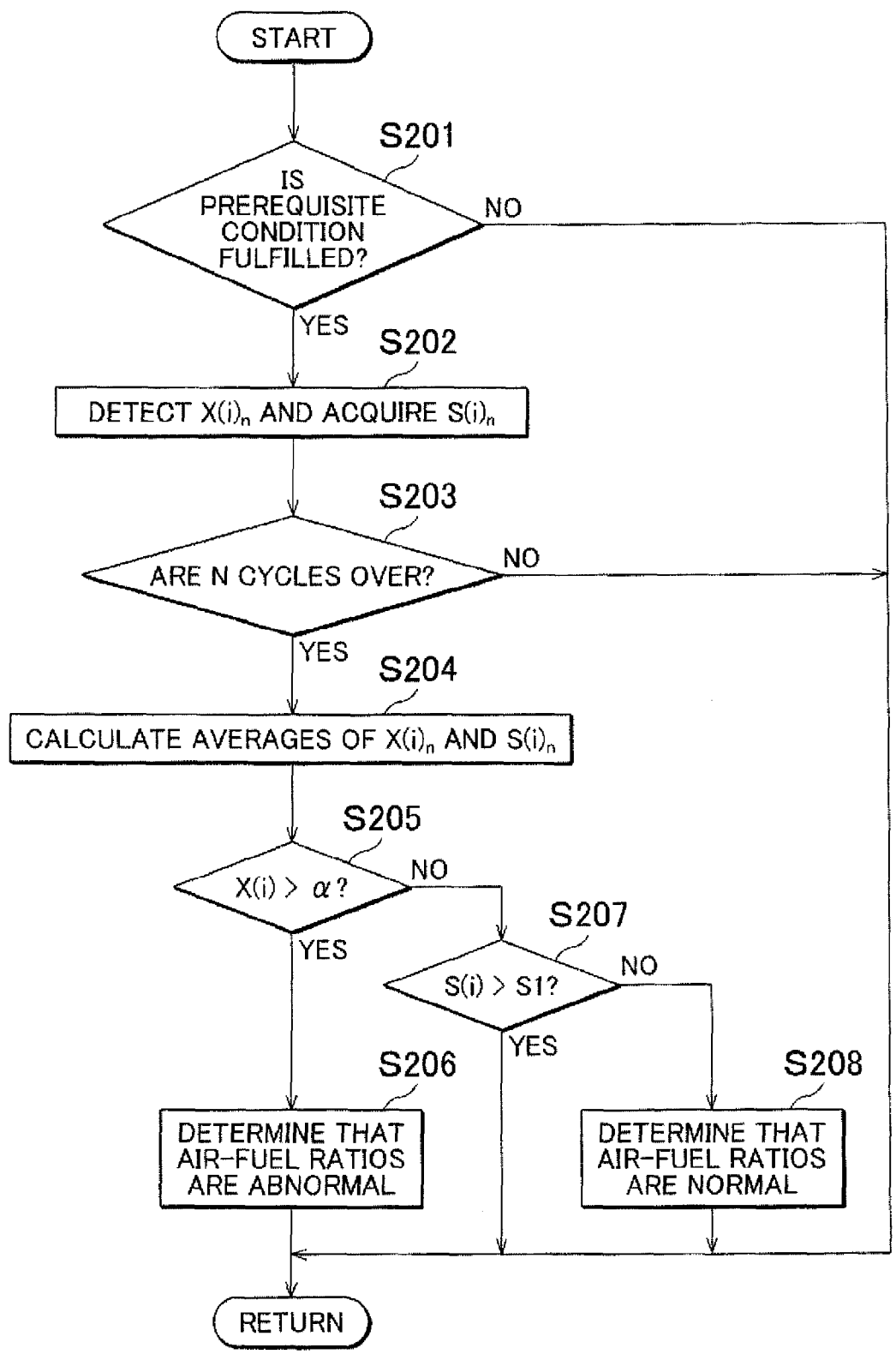
FIG. 11 is a flowchart of a routine of detecting an abnormality of imbalance in this embodiment of the invention.

FIG. 11 shows a flowchart of a routine of detecting an abnormality of imbalance. The routine shown in FIG. 11 is started simultaneously with engine startup by the ECU 20, and is repeatedly executed on a predetermined calculation cycle. The timing of executing the routine is preferably set to the TDC of each of the cylinders, namely, the same timing as the timing of detecting the angular velocity $\omega$.

In step S201, it is determined whether or not a predetermined prerequisite condition is fulfilled. This prerequisite condition includes a condition that the engine be operated idly. Instead, the prerequisite condition may include a condition that the engine be operated idly and in a low rotation/low load range close to idling. This prerequisite condition does not include any condition regarding the working angle.

If the result of the determination in step S201 is yes, a transition to step S202 is made. If the result of the determination in step S201 is no, the routine is ended.

In step S202, a rotational fluctuation parameter $X(i)_n$ of each of the cylinders at a current timing n is calculated or detected, and a value of a target working angle $S(i)_n$ at the current timing n is acquired. It should be noted herein that i denotes a cylinder number (i=1, 2, 3, and 4). The value of the rotational fluctuation parameter $X(i)_n$ and the value of the target working angle $S(i)_n$ are associated with each other according to the cylinder number i and the timing.

In step S203, it is determined whether or not N cycles of the engine have ended since a time point of initial execution of step S202. N denotes an integer larger than 1, and is, for example, 100. One cycle of the engine is 720° CA. If N cycles of the engine have not ended, the routine is ended. If N cycles of the engine have ended, a transition to step S204 is made. When N cycles of the engine end, sample data on N rotational fluctuation parameters $X(i)_n$ of each of the cylinders and N target working angles $S(i)_n$ corresponding to these rotational fluctuation parameters $X(i)_n$ of each of the cylinders respectively are obtained as a result.

In step S204, averages of these rotational fluctuation parameters $X(i)_n$ of each of the cylinders and these target working angles $S(i)_n$ are calculated. More specifically, the sum of the rotational fluctuation parameters $X(i)_n$ of each of the cylinders is averaged by being divided by the number N of samples individually for each of the cylinders, and the sum of the target working angles $S(i)_n$ of each of the cylinders is averaged by being divided by the number N of samples individually for each of the cylinders. The averages thus obtained are expressed as $X(i)$ and $S(i)$ respectively. By thus calculating the averages, the rotational fluctuation parameter $X(i)_n$ and the target working angle $S(i)_n$, which constantly change, are averaged, and the detection accuracy is enhanced. However, this averaging is not absolutely required to be carried out.

In step S205, the rotational fluctuation parameter X(i) of each of the cylinders as an average is compared with a criterial value α individually for each of the cylinders.

If the rotational fluctuation parameter X(i) of any one of the cylinders is larger than the criterial value α, a transition to step S206 is made, and it is determined that the air-fuel ratios are abnormal. That is, if the rotational fluctuation parameter X(i) larger than the criterial value α is obtained, it is immediately determined that the air-fuel ratios are abnormal. Also, the cylinder exhibiting the rotational fluctuation parameter X(i) larger than the criterial value α is identified as an abnormal cylinder.

If the rotational fluctuation parameters X(i) of all the cylinders are equal to or smaller than the criterial value α, a transition to step S207 is made, and the average S(i) of the target working angle of each of the cylinders is compared with the threshold S1 individually for each of the cylinders.

If the target working angle S(i) of any one of the cylinders is larger than the threshold S1, namely, within the large working angle range, the routine is ended without determining that the air-fuel ratios are normal, whereby a determination that the air-fuel ratios are normal is withheld. Intrinsically, since the rotational fluctuation parameters X(i) of all the cylinders are equal to or smaller than the criterial value α, it can be determined that the air-fuel ratios are normal. However, if the target working angle S(i) is larger than the threshold S1 in any one of the cylinders, the rotational fluctuation parameter X(i) may be equal to or smaller than the criterial value α despite the occurrence of a working angle decreasing deviation in that cylinder. Therefore, with a view to preventing an erroneous determination, if the target working angle S(i) is larger than the threshold S1 in any one of the cylinders, a determination that the air-fuel ratios are normal is withheld.

In this manner, even in the case where the detected rotational fluctuation parameter X is a normal-side value with respect to the criterial value α (a value equal to or smaller than the criterial value α), if the working angle at the time of detection of the rotational fluctuation parameter X is within the large working angle range, a determination that the air-fuel ratios are normal is withheld.

In step S207, if the target working angles S(i) of all the cylinders are equal to or smaller than the criterial value α, namely, within the small working angle range, a transition to step S208 is made to determine that the air-fuel ratios are normal. In this case, since it is guaranteed that there is no working angle decreasing deviation in any one of the cylinders, it is determined that the air-fuel ratios are normal.

In this embodiment of the invention, the target working angle is used as the value of the working angle. However, in the case where an actual working angle is detected, a detected value of the actual working angle may be used. In this embodiment of the invention, the average of the target working angles is obtained individually for each of the cylinders. However, the average of the target working angle may be obtained without making a distinction among the cylinders. In other words, the total sum of the target working angles $S(i)_n$ of the respective cylinders may be averaged by being divided by (the number N of samples×the number 4 of cylinders).

Operation examples in the case where the aforementioned control and processing are performed will be described hereinafter.

Figure 12:
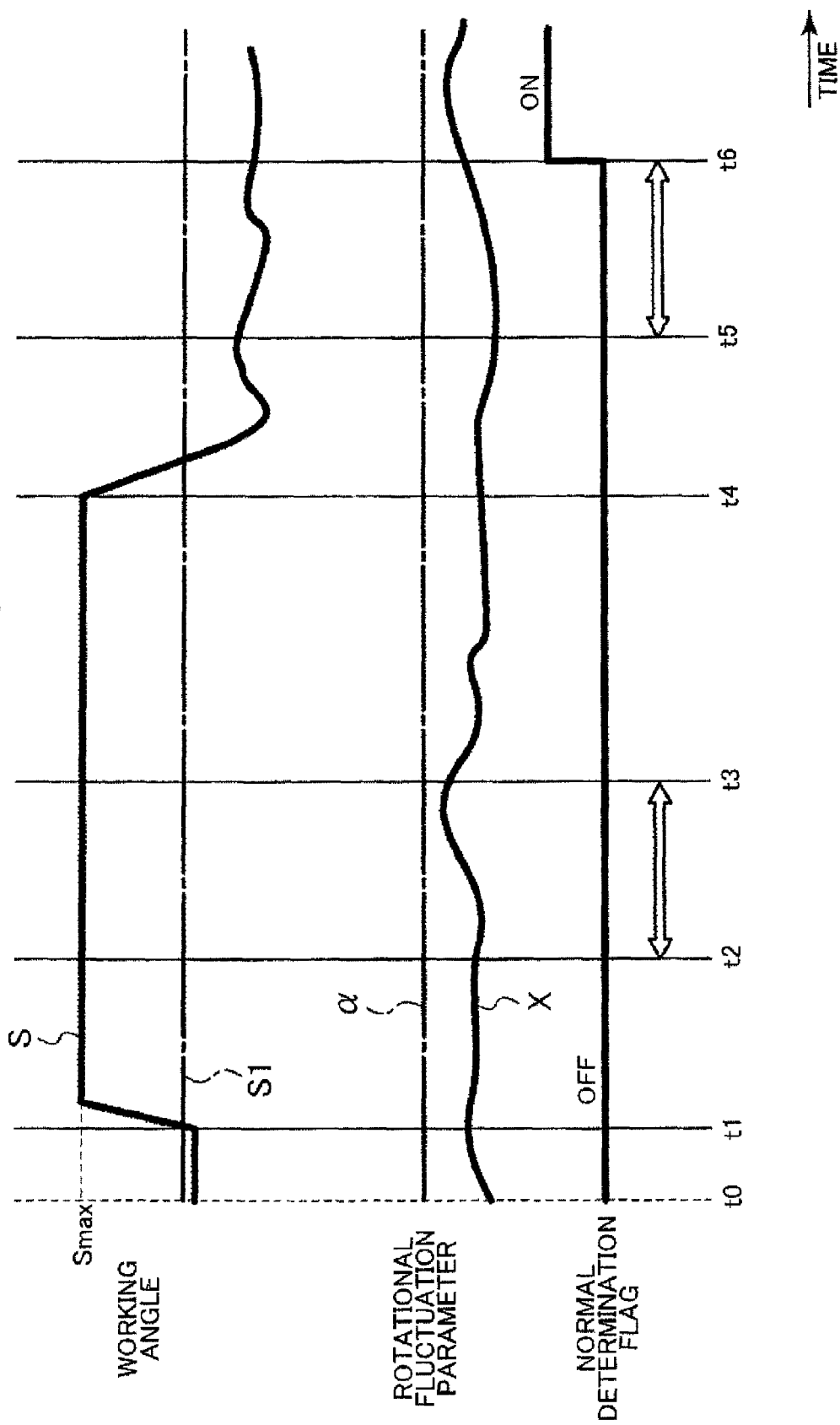
FIG. 12 is a time chart of a first operation example in this embodiment of the invention.

FIG. 12 shows the first example, and shows how the working angle S, the rotational fluctuation parameter X, and a normal determination flag change after the engine is started in a relatively low temperature state (especially in a cold state). It should be noted herein that the normal determination flag is a flag that is turned on as soon as it is determined that the air-fuel ratios are normal, and that is off prior thereto.

After the engine is started at a time point t0, the routine of setting the working angle control mode in FIG. 10 is started at a time point t1, which corresponds to the lapse of a short time from the time point t0. In the first operation example shown in FIG. 12, a warm-up completion condition (step S101) is not fulfilled, the working angle control mode is set to the fixed working angle mode, and the working angle S is fixed to the maximum working angle Smax. The fixed working angle mode is continued for a relatively long time until a time point t4.

In a period between a time point t2 and a time point t3, which are between the time point t1 and the time point t4, the prerequisite condition of the routine of detecting an abnormality of imbalance in FIG. 11 (step S201) is fulfilled, and imbalance abnormality detection is carried out. While this detection is carried out, the value of the rotational fluctuation parameter X does not exceed the criterial value α, but the working angle S is larger than the threshold S1 and within the large working angle range. Therefore, it is not determined that the air-fuel ratios are normal (step S207: YES). The normal determination flag remains off.

At the time point t4, the warm-up completion condition (step S101) and a learning completion condition (step S102) (especially the former) in the routine of setting the working angle control mode in FIG. 10 are fulfilled, and the working angle control mode is shifted to the variable working angle mode (step S103). The working angle S is then controlled to a value corresponding to the rotational speed and the load. As a result, in the first operation example shown in FIG. 12, the working angle S is shifted from the large working angle range larger than the threshold S1 to the small working angle range equal to or smaller than the threshold S1.

In a subsequent period between a time point t5 and a time point t6, the prerequisite condition (step S201) of the routine of detecting an abnormality of imbalance in FIG. 11 is fulfilled, and imbalance abnormality detection is carried out. While this detection is carried out, the value of the rotational fluctuation parameter X has not exceeded the criterial value α. Moreover, since the working angle S is within the small working angle range, it is determined at the time point t6 that the air-fuel ratios are normal (step S208). At the same time, the normal determination flag is switched from off to on.

Figure 13:
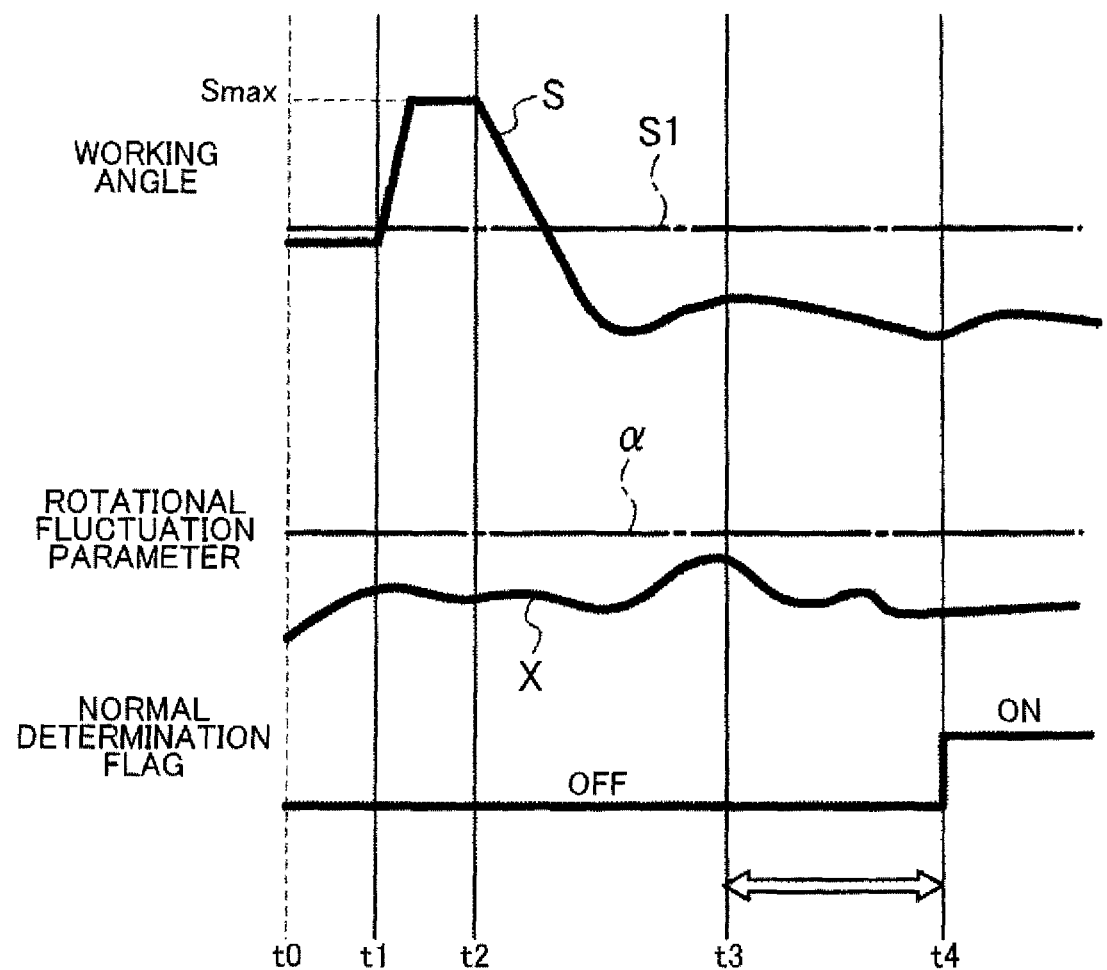
FIG. 13 is a time chart of a second operation example in this embodiment of the invention.

FIG. 13 shows the second operation example, and shows how the working angle S, the rotational fluctuation parameter X, and the normal determination flag change after the engine is started in a relatively high temperature state (especially in a warm state).

After the engine is started at the time point t0, the routine of setting the working angle control mode in FIG. 10 is started at the time point t1, which corresponds to the lapse of a short time from the time point t0. In the second operation example shown in FIG. 13, the warm-up completion condition (step S101) is not fulfilled. Therefore, the working angle control mode is set to the fixed working angle mode, and the working angle S is fixed to the maximum working angle Smax. In the case of this second operation example, since the warm-up completion condition is fulfilled early, the fixed working angle mode is continued only for a relatively short time until the time point t2.

In the meantime, in the period between the time point t1 and the time point t2, the prerequisite condition (step S201) of the routine of detecting an abnormality of imbalance in FIG. 11 is not fulfilled, and detection of an abnormality of imbalance is not carried out.

At the time point t2, the warm-up completion condition (step S101) and the learning completion condition (step S102) (especially the former) in the routine of setting the working angle control mode in FIG. 10 are fulfilled, and the working angle control mode is shifted to the variable working angle mode (step S103). In the second operation example shown in FIG. 13, the working angle S is shifted from the large working angle range larger than the threshold S1 to the small working angle range equal to or smaller than the threshold S1.

In the subsequent period between the time point t3 and the time point t4, when the prerequisite condition (step S201) of the routine of detecting an abnormality of imbalance in FIG. 11 is fulfilled, imbalance abnormality detection is carried out. While this abnormality detection is carried out, the value of the rotational fluctuation parameter X has not exceeded the criterial value $\alpha$. Furthermore, since the working angle S is within the small working angle range (step S207: NO), it is determined at the time point t4 that the air-fuel ratios are normal (step S208). At the same time, the normal determination flag is switched from off to on.

While the preferred embodiment of the invention has been described above in detail, various other embodiments of the invention are conceivable. The aforementioned numerical values are nothing but exemplification, and can be appropriately changed. A mechanism that makes a changeover between two cams with different working angles may be employed as the variable working angle mechanism, and the invention is also applicable to this mechanism. In this case, the time when a large cam with a large working angle is used corresponds to the time when the working angle is within the large working angle range, and the time when a small cam with a small working angle is used corresponds to the time when the working angle is within the small working angle range. The working angle during the use of the large cam is a maximum working angle, and the working angle during the use of the small cam is a minimum working angle.

The embodiment of the invention is not limited to the foregoing embodiment of the invention. The invention includes all modification examples, application examples, and equivalents that are encompassed in the idea of the invention defined by the claims. Accordingly, the invention should not be construed in a limited manner, but is also applicable to any other art belonging to the scope of the idea of the invention.

What is claimed is:

1. A detecting apparatus that detects an abnormality of imbalance of air-fuel ratios among cylinders, the detecting apparatus comprising:
a variable working angle mechanism that makes variable a working angle of an intake valve of each of the cylinders in a multi-cylinder internal combustion engine, and
an abnormality detection portion that detects a parameter regarding rotational fluctuations of each of the cylinders and detects, on a basis of this detected parameter, whether or not there is an abnormality of imbalance of the air-fuel ratios among the cylinders, wherein
the abnormality detection portion refrains from determining that the air-fuel ratios are normal when the working angle at a time of detection of the parameter is within a predetermined large working angle range, and determines that the air-fuel ratios are normal when the working angle at the time of detection of the parameter is within a predetermined small working angle range that is on a small working angle side with respect to the predetermined large working angle range.

2. The detecting apparatus that detects an abnormality according to claim 1, wherein the abnormality detection portion refrains from determining that the air-fuel ratios are normal when the working angle at the time of detection of the parameter is within the predetermined large working angle range even if the detected parameter is a value that is on a normal side with respect to a predetermined criterial value.

3. The detecting apparatus that detects an abnormality according to claim 1, wherein the abnormality detection portion detects an abnormality of imbalance of the air-fuel ratios among the cylinders that results from a decreasing deviation of a working angle of a specific one of the cylinders.

4. The detecting apparatus that detects an abnormality according to claim 1, wherein the predetermined large working angle range includes a maximum working angle, and the predetermined small working angle range includes a minimum working angle.

* * * * *